INVENTOR.
RICHARD B. LUCKENBACH
BY *William Foley*
ATTORNEY

May 28, 1963  R. B. LUCKENBACH  3,091,268
CONTOURING MACHINES
Filed Aug. 14, 1961  4 Sheets-Sheet 2
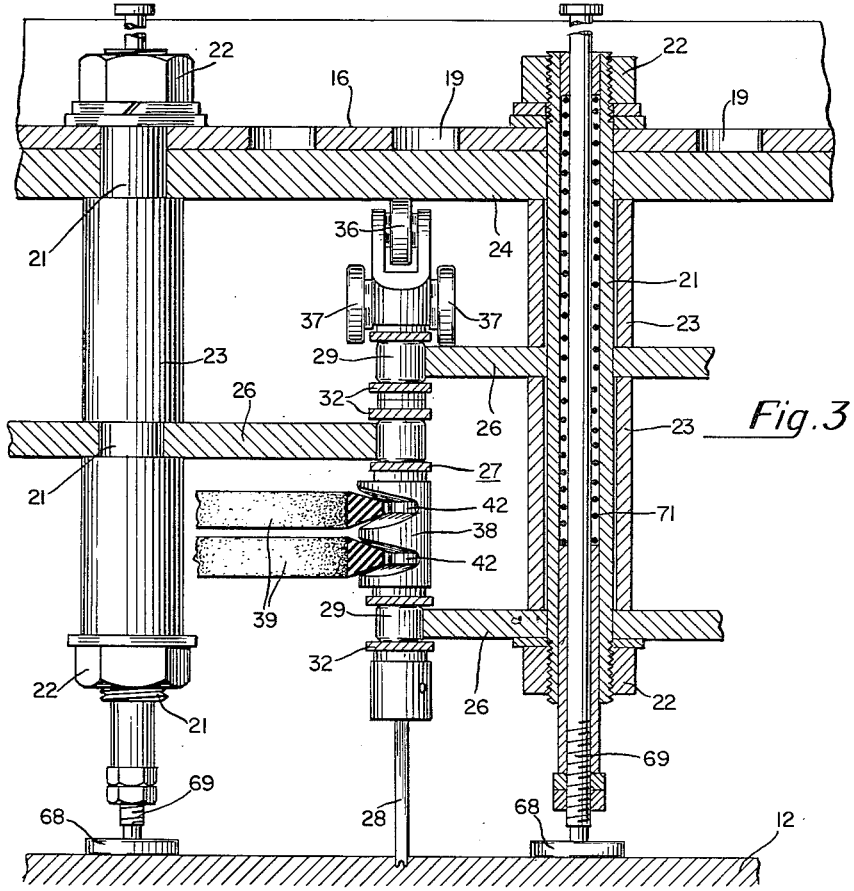
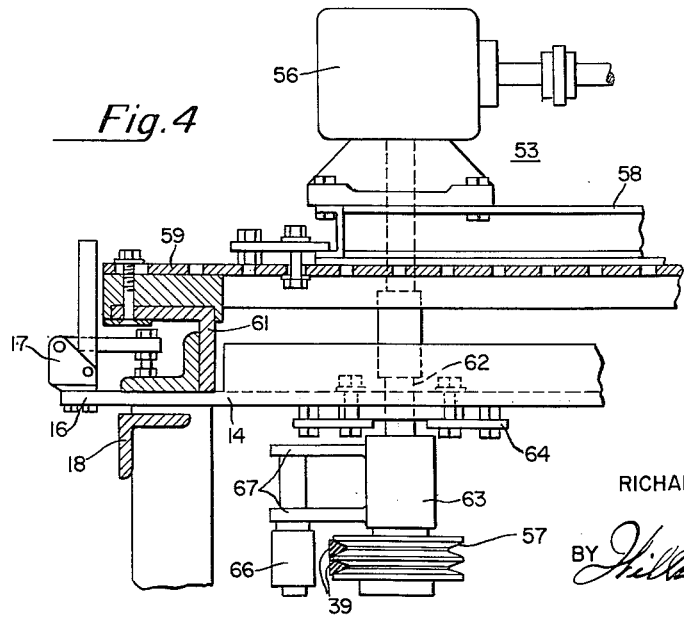
INVENTOR.
RICHARD B. LUCKENBACH
BY *William J. Foley*
ATTORNEY May 28, 1963  R. B. LUCKENBACH  3,091,268
CONTOURING MACHINES
Filed Aug. 14, 1961  4 Sheets-Sheet 3
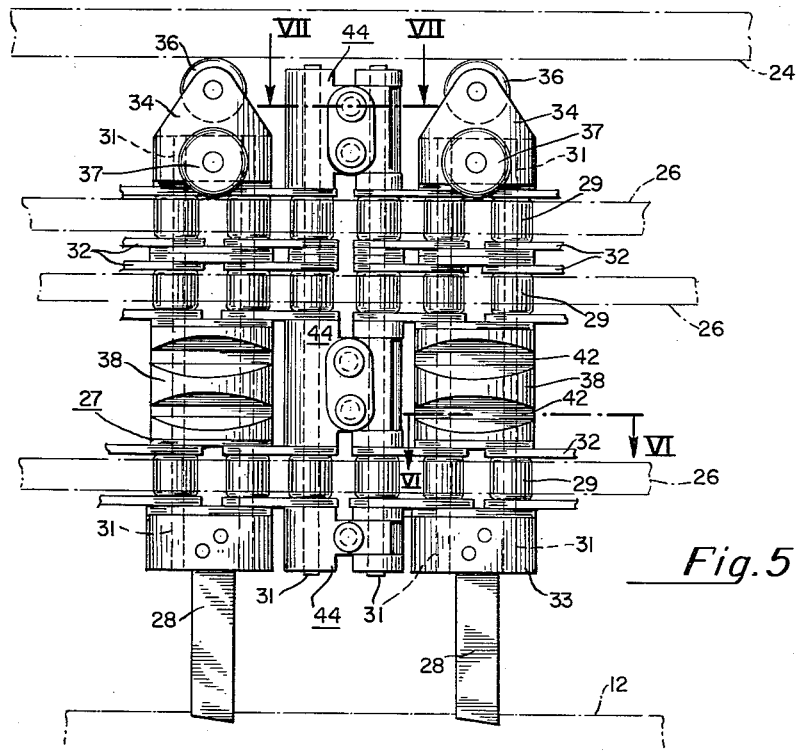
Fig. 5
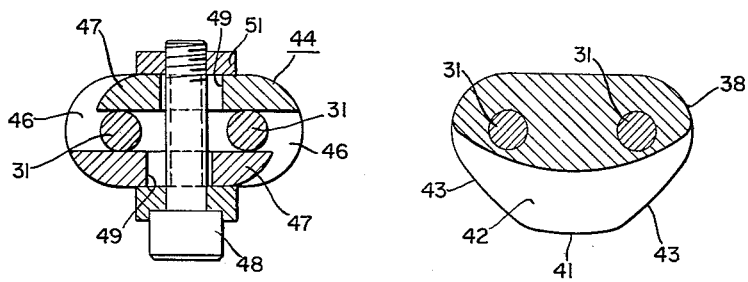
Fig. 7
Fig. 6
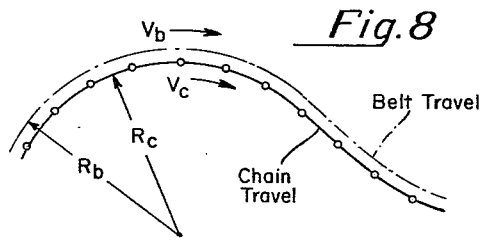
Fig. 8
INVENTOR.
RICHARD B. LUCKENBACH
BY *William J Foley*
ATTORNEY May 28, 1963  R. B. LUCKENBACH  3,091,268
CONTOURING MACHINES Filed Aug. 14, 1961  4 Sheets-Sheet 4

INVENTOR.
RICHARD B. LUCKENBACH

BY William J. Foley
ATTORNEY 3,091,268
CONTOURING MACHINES
Richard B. Luckenbach, 1011 Woodside Ave., Secane,
Delaware County, Pa.
Filed Aug. 14, 1961, Ser. No. 131,214
10 Claims. (Cl. 144—144)

This invention relates to contouring machines and more particularly to contouring machines for cutting articles of irregular shape from sheet materials.

The present invention is an improvement upon the machine described and claimed in my Patent No. 2,517,901, granted August 8, 1950, and entitled "Contouring Machine." That machine, like the machine of the present invention, employs a flexible chain for supporting and moving cutting tools in a predetermined endless path across the face of a work piece. That chain was driven by a sprocket having angularly spaced teeth arranged to mesh with the elements of the chain. While entirely satisfactory in most respects, the drive arrangement of my prior machine necessitated the use of a tool carrying chain whose length was in some multiple of the sprocket tooth spacing. It was, therefore, not always possible to provide exactly the peripheral length required to produce the finished article. Moreover, no provision could be made for shortening the length of the chain by an amount less than the sprocket tooth spacing and, thus, adjustments to compensate for wear of parts of the tool chain were not possible.

The drive arrangement in my prior contouring machine also required that the path of the tool chain be chosen so as to permit engagement of the chain by the drive sprocket at some point in its path. For maximum contact between the chain and the sprocket teeth, a pronounced curve, or bend, had to be provided in the path of the tool chain, which, again, made it difficult to match the path of the tool chain to the desired shape of the finished article.

The principal object of this invention is to improve the versatility and increase the flexibility of application of a contouring machine employing a tool chain that travels in an endless path. In accordance with this invention, a tool carrying chain is constructed with a length exactly matching the path of tool travel required to produce the desired shape of the finished article or articles. This path, and consequently the length of the chain and spacing of the chain parts, is chosen without reference to the means for driving the chain. Then, further in accordance with the invention, this tool chain is driven by means of one or more flexible belts which encompass the chain path and engage friction members, or drive lugs, carried by the chain and movable therewith. The belt or belts are caused to pass around a powered pulley or sheave which imparts a driving force to the belt which is transmitted by the belt to the chain to cause the chain to move through its path.

This improved drive arrangement removes restrictions upon spacing of the elements of the tool chain, so that the chain may, if desired, include one or more adjustable links which provide a means for adjusting the length of the chain so as to match the length to the desired path of the cutting tools and to compensate for changes in chain length caused by wear of parts. This invention contemplates the use of a novel form of adjustable links for this purpose, which will be described hereinafter.

Other features, advantages, and objects of the invention will become apparent from the following detailed description of the invention in which reference is made to the accompanying drawings, forming a part hereof, and wherein:

FIGURE 3 is an enlarged, vertical sectional view through the cutter assembly of the machine, taken as indicated by line III—III of FIGURE 2;

FIGURE 4 is an enlarged vertical sectional view taken as indicated by line IV—IV in FIGURE 2;

FIGURE 5 is an enlarged fragmentary illustration of the tool chain employed in the machine;

FIGURE 6 is an enlarged sectional view through one of the driving lugs on the chain, and taken on line VI—VI of FIGURE 5;

FIGURE 7 is an enlarged sectional view through an adjustable link of the chain, and taken on line VII—VII of FIGURE 6;

FIGURE 8 is a schematic illustration of belt and tool chain travel in the machine;

Figure 1:
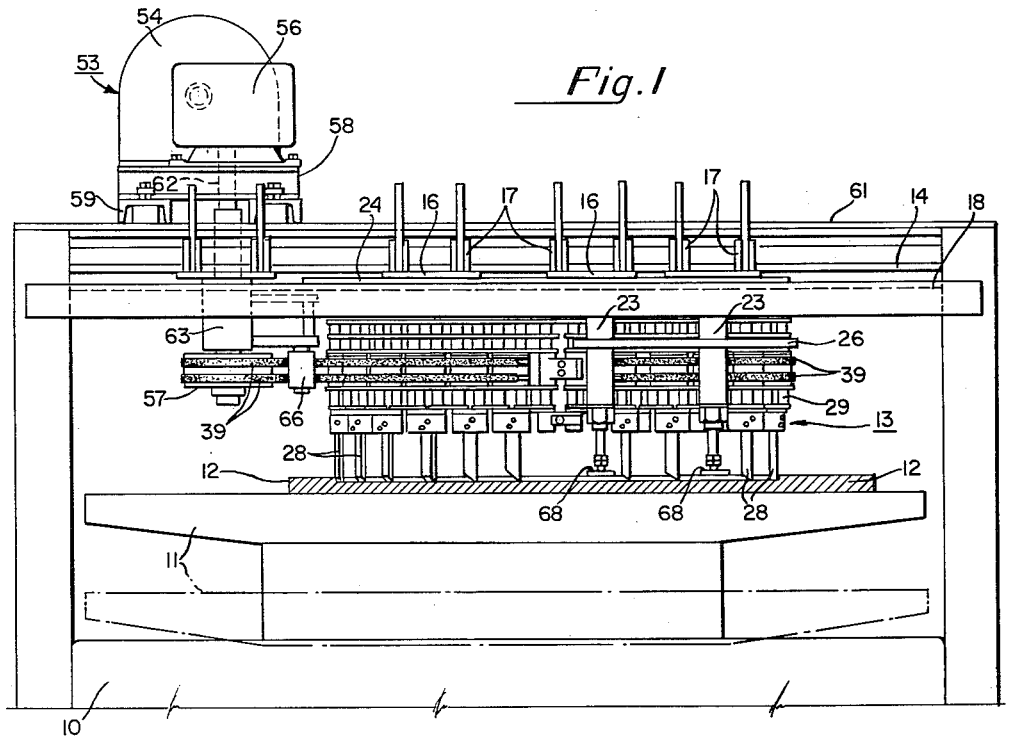
FIGURE 1 is a fragmentary front elevational view of a contouring machine constructed in accordance with my invention.

Referring particularly to FIGURE 1, the improved contouring machine includes a base 10, the lower portion of which has been omitted from the drawing. The base 10 includes a vertically movable work support 11, upon which rests the work piece or pieces 12. The work support 11 is elevated and lowered by machinery (not shown) located within the base 10 to move the work piece 12 into and out of engagement with a cutter assembly, identified generally by the reference numeral 13.

The cutter assembly 13 is carried by a frame projecting upwardly from the base 10 and including a pair of head rails 14 extending lengthwise of the machine and parallel to the work support 11. Extending transversely (front to rear of the machine) between the two head rails 14 are a number of carrier channels 16 from which the cutter assembly 13 is suspended. The ends of the carrier channels have clamps 17 thereon for securing the channels to the rails 14. When released, the clamps 17 permit the channels 16 to drop down on rest bars 18, disposed beneath the rails 14, and upon which the channels may be moved when setting up the machine (see FIGURE 4).

Each carrier channel 16 has a row of spaced openings 19, extending lengthwise thereof, through which pass the upper ends of a number of guide bolts 21, which coact with nuts 22 and spacers 23 (see FIGURE 3) to clamp a bearing plate 24 against the under surfaces of the carrier channels and support spaced guide plates 26 below the bearing plate.

Figure 2:
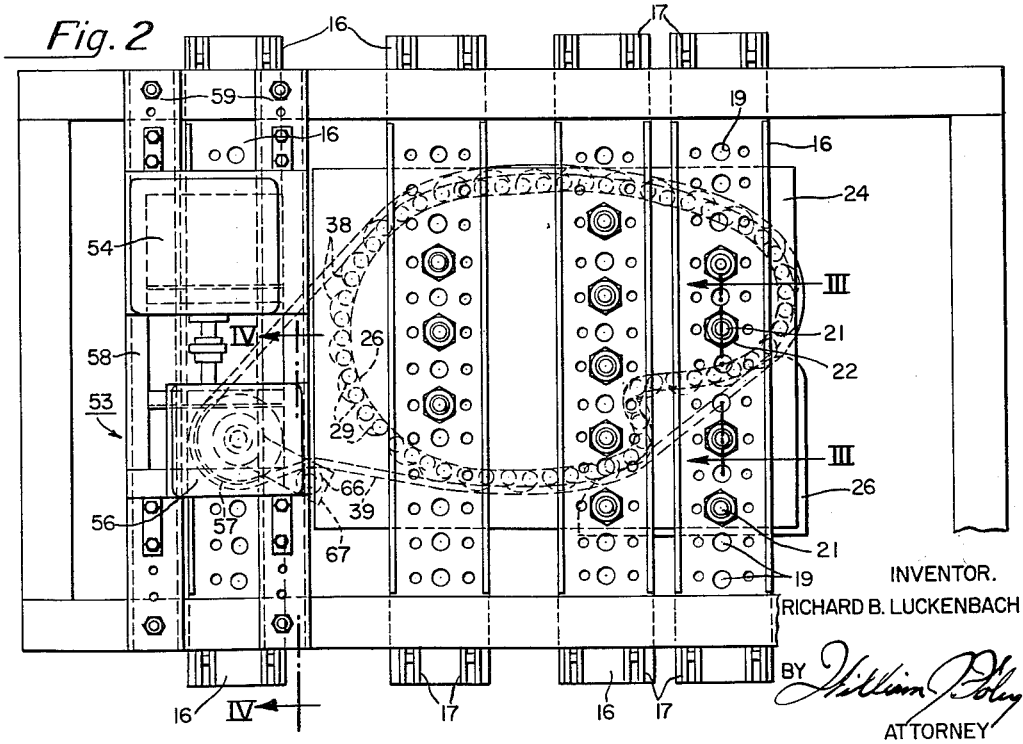
FIGURE 2 is a plan view of the contouring machine with portions thereof broken away.

Plates 24 and 26 form a part of the cutter assembly 13 which also includes an endless tool chain 27 having a plurality of cutting tools 28 projecting downwardly therefrom. The edges of the guide plates 26 engage bearing members 29 on chain 27 and are formed to guide the chain through a predetermined endless path corresponding to the shape of the article or articles being cut from the work piece 12. The machine illustrated in the drawings is set up to cut artist's pallets from flat sheets of material, such as wood, fibre board, or plastic. Two of the guide plates 26 are of substantially the same shape as the article and are disposed inside the path of movement of the chain 27 (FIGURE 3). Another of the guide plates, 26, engages the chain 27 from outside the path of chain movement along that portion of the path where the belt is required to execute a reverse, or concave, curve (see FIGURE 2).

It can be appreciated that differently shaped guide plates 26 are required to produce differently shaped articles and that their number and disposition will vary from article to article. The guide plates are used in sufficient number and in such locations as may be required to closely guide the chain 27 through its required path of movement.

The construction of the tool chain 27 is illustrated in FIGURES 3 and 5, from which it can be seen that the chain comprises a plurality of pairs of pins or pin members 31 which are arranged in spaced, parallel relationship throughout the chain. Links 32 pivotally connect adjoining pairs of pins. The majority of the pairs of pins are connected at their lower ends by tool holders 33 from which the tools 28 depend. These pairs of pins are also connected at their upper ends by thrust heads 34 which carry rotatable upper and lower thrust wheels or rollers, identified by numerals 36 and 37, respectively. The upper thrust wheels 36 engage and roll on bearing plate 24 to limit upward movement of the tool chain when the work piece 12 is brought into engagement with the tools 28. The lower wheels support the weight of the chain 27 when the work piece is lowered away from the tools and are adapted to ride on the upper periphery of the uppermost one of the guide plates 26. A down thrust wheel 37 is provided on each side of each head 34 to support the chain from guide plates 26 disposed either inside or outside the path of the chain.

In accordance with this invention, at least some, and preferably all, of the pairs of pins 31 which are joined by tool holders 31 also carry friction drive members, or lugs, 38, which are engaged by one or more flexible belts 39 for propelling the chain 27 through its path of travel. Each lug 38 has portions 41 thereof projecting outwardly of the path of travel of the chain and providing grooves 42 for the reception of the belts 39 (see FIGURES 5 and 6). The grooves in the lugs 38 are aligned in planes parallel to the plane of the work support (plane of movement of the chain) and provide discontinuous rows or lines of friction surfaces for the belts to engage and grip in moving the chain. Each groove is preferably curved, convexly outwardly of the path of the belt to insure an extended gripping surface when the belt is executing, or traversing, convex curves in its path of travel. In addition, the front and rear vertical faces 43 of those portions 41 of the lugs 38 which extend outwardly from the chain are beveled, that is, arranged in converging fashion, to permit the chain to execute sharp radii, concave curves without interference between adjacent lugs.

Certain pairs of pins 31 of the chain 27 are connected by adjustable links 44, as shown in FIGURES 5 and 7, to enable the length of the chain to be changed in small amounts. Small length changes, other than those which can be obtained by omitting or adding a pair of pins 31 and one set of links 32, are desirable in order to exactly match the length of the chain 27 to the length of the desired cutting path and to cause the chain to closely follow but not bind on the guide plates 26. If, for example, each adjustable link 44 permits the length of the chain to be changed by an amount equal to one-third of the amount of change obtained by removing or adding a pair of pins 31, then the inclusion of three adjustable links at spaced locations in the chain 27 renders the chain infinitely adjustable as to length.

The adjustable links are illustrated in FIGURES 5 and 7 of the drawings and comprise several sections, each of which is made from two similarly shaped parts, having eyelet portions 46 through which one of the chain pins extends, and side plates 47, integral with the eyelets and extending across the pin passing through the other part. One or more bolts 48 pass through transversely elongated openings 49 in the side plates 47 and are threadably received in plate 51 for clamping the side plates 47 together with the pair of chain pins 31 therebetween. Adjustment of the spacing between the two chain pins 31 which carry the adjustable link is effected by loosening the bolts 48, repositioning the side plates 47, and tightening the bolts.

It is to be noted that the unequal spacing between different pairs of pins 31 which may result from adjustment of links 44 in no way affects the drive for the tool chain 27. Whereas in my prior contouring machine of Patent No. 2,517,901, the pin spacing was required to be uniform because the chain was driven by a sprocket, the improved belt drive of the present invention places no such limitation on the length of chain 27.

Any suitable means may be employed to impart a driving force to the belts 39 which encompass the tool chain 27; I prefer a power unit such as that shown in the drawings and identified generally by the reference numeral 53. The unit 53 comprises a motor 54, which through a speed reduction unit 56 drives a multi-groove pulley 57 about which the drive belts 39 run (see FIGURE 1). The motor 54 and the speed reduction unit together form a drive assembly which is mounted on a frame-like bed 58, which is adjustably positioned on a pair of support bars 59 extending from front to rear of the machine and resting on another pair of horizontal support bars 61, extending across the front and the rear of the machine. This support arrangement permits the drive assembly to be positioned in any desired location across the face of the work support 11.

The belt drive pulley 57 is driven from the speed reduction unit 56 by a vertical shaft 62 which extends through a flanged bearing collar 63 clamped to the underside of one of the carrier channels 16. The clamping means for collar 63 is identified by numeral 64 in FIGURE 4 and can be loosened to permit rotation of the collar with respect to the carrier channel 16 for the purpose of adjusting the position of a tensioner roller 66 carried by arms 67 extending radially outwardly from the collar. The roller 66 presses against the outside surface of the drive belts 39 to force regions of the belts inwardly to take up any slack in the belts and thereby cause the belts to firmly engage the driving lugs 38 on the tool chain.

In operation, the motor 54 provides a driving force which is transmitted to the tool chain 27 by the belts 39. The work support 11 is elevated to move the work piece 12 into contact with the cutting tools 28 carried by the chain. As the tools 28 cut into the work piece the work support continues to move upwardly to feed the work into the tools. While but a single work piece is illustrated, it is to be understood that more than one layer or thickness of material may be acted upon at one time, and several articles thereby produced with one loading of the machine.

During the cutting operation the work is prevented from moving on the work support by pressure pads 68 which are secured to spring biased rods 69 extending downwardly through the guide bolts 21, which are made hollow for this purpose (see FIGURE 3). Springs 71, also contained within the hollow bolts 21, bias the rods against the work piece.

It is important for reliable operation of my improved machine that a positive driving relationship be maintained between the drive belt or belts 39 and the tool chain 27. Achieving this condition is complicated by the fact that if the path of travel of the belt does not coincide with the path of travel of the tool chain when these members are in contact a certain amount of slippage must take place between the belt and the chain during at least a portion of their travel. FIGURE 8 schematically illustrates the relationships which dictate such relative movement. As there shown, the path of travel of the drive belt is outside the path of travel of the chain. This is due to the construction of drive lugs 38 (see FIGURE 3). In traversing a curved portion of the pattern the belt follows a path having a greater radius of curvature, $R_b$, than the radius of curvature, $R_c$, of the chain path. Consequently, the belt traverses a greater distance than the chain in moving through that curve. In traveling a relatively linear portion of the path of travel the belt and the chain move the same distance. Consequently, some slippage must take place between the belt and the chain either in the curved portions of their travel or in linear portions of their travel.

The V-grooves in drive lugs 38 and the corresponding V-shape of drive belts 39 permit relative slippage of the belts and the lugs, and yet, provide sufficient purchase, or gripping action, to enable a driving force to be transmitted to the tool chain.

FIGURES 9 through 13 illustrate certain modifications of the invention intended to further increase the driving force which can be transmitted to a tool chain by a drive belt. Tool chain 75 in FIGURES 9 and 10 incorporates a series of modified drive lugs, or friction pads, 76 (only one being shown). Drive lug 76 has a V-groove 77 therein, the base of which groove possesses a plurality of vertically disposed flutes, or teeth, 78. This modified drive lug 76 is thereby adapted to receive a drive belt 79 (see FIGURE 11) having a plurality of complementary driving projections 80 on the inner face thereof. Belt projections 80 engage teeth 78 in drive lugs 77 to increase traction of the belt against tool chain 75. Preferably, projections 80 are of limited height so as to permit the projections to override teeth 78 in those regions of travel in which the belt and the lugs are not traveling at the same velocity.

Figure 9:
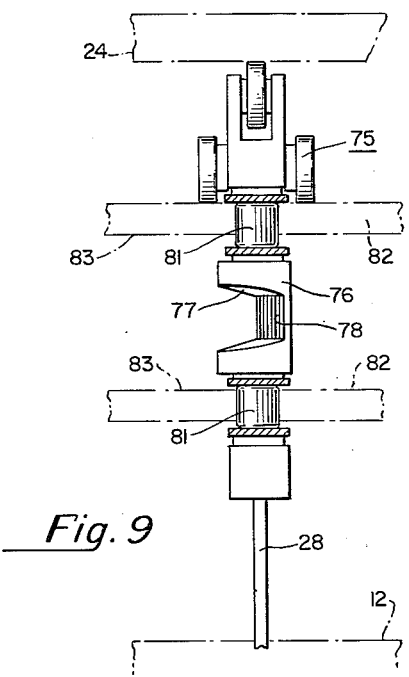
FIGURE 9 is a view similar to FIGURE 3 but showing a modified tool chain.
Figure 10:
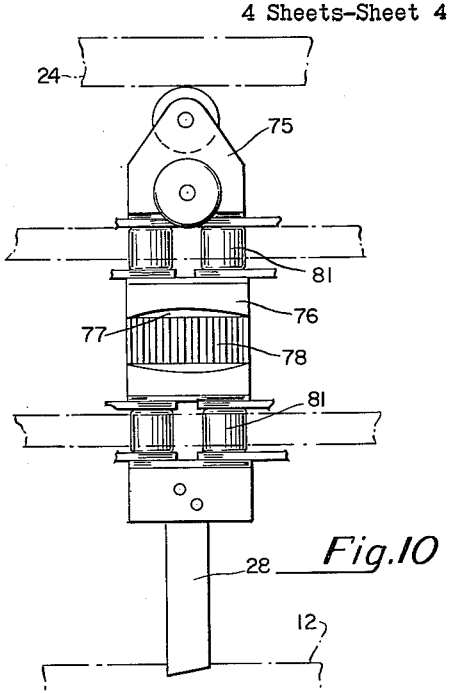
FIGURE 10 is an elevational face view of a cutter element of the modified tool chain.
Figure 11:
FIGURE 11 is a view of a drive belt used with the modified tool chain.

It will also be noted that a modified guiding arrangement is illustrated in FIGURES 9 and 10. The tool chain 75 is simplified somewhat to include but two sets of rollers 81 which travel between opposed pairs of inner and outer guide plates, indicated at 82 and 83, respectively. A pair of outer guide plates 83, while somewhat more complicated than the single outer guide in the embodiment of the invention illustrated in FIGURE 3, offers the advantage of providing more positive guiding for the tool chain 75.

Figure 12:
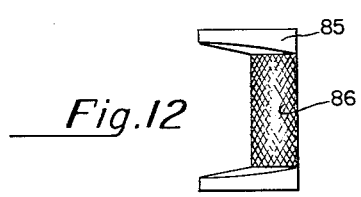
FIGURES 12 and 13 are edge and face views, respectively, of another modification of a drive lug employed in the tool chain; and, FIGURE 14 is a sectional view of a drive belt suitable for use with the drive lug of FIGURES 12 and 13.
Figure 13:
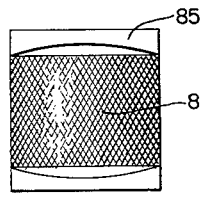
Figure 14:

A further belt and drive lug combination is illustrated in FIGURES 12 through 14 wherein a drive lug 85 is illustrated in which a knurled gripping face 86 is provided for engagement by a belt 87, having a nubbly surface 88. Cooperation of the lug 85 and belt 87 is such as to permit a driving force to be transmitted from the belt to the lug when both are traveling at the same velocity and to permit portions of the belt to slide or slip on the lug when relative movement therebetween is required.

While the invention has been shown and described with reference to several forms thereof, it is to be understood that further changes and modifications can be made therein without departing from the spirit and scope of the invention.

What I claim is:

1. In a contouring machine, a work support, a plurality of elements disposed normal to said work support, members connecting said elements to form therewith an endless chain, means to support and guide said elements for movement serially through a predetermined endless path, a plurality of friction pads carried by said elements at spaced locations along the length of said chain, a flexible belt encompassing said chain and frictionally engaging a plurality of said pads, and means for driving said belt in an endless path to effect movement of said elements.

2. In a contouring machine, a work support, an endless chain comprising a plurality of elements disposed normal to said work support and members connecting said elements, means to support and guide said chain for movement serially through a predetermined endless path, a tool carried by said chain for acting on work supported by said work support, a plurality of friction members carried by said chain at spaced locations along the length thereof, a flexible belt encompassing said chain and engaging a plurality of said friction members, and means for driving said belt to effect movement of said chain.

3. In a contouring machine, a work support, an endless chain comprising a plurality of elements disposed normal to said work support and members connecting said elements, means to support and guide said chain for movement serially through a predetermined endless path, a tool carried by said chain for acting on work supported by said work support, a plurality of friction members carried by said chain at spaced locations along the length thereof, each of said friction members having one or more grooves in the surface thereof which is disposed outwardly of the path traversed by said chain, each of said grooves having side walls which converge toward the bottom of the groove, a flexible V belt encompassing said chain and engaging the grooves in a plurality of said friction members, and means for driving said belt to effect movement of said chain and said tool.

4. In a contouring machine, a work support, an endless chain having a tool thereon for engaging work on said work support, means to support and guide said chain for movement serially through a predetermined endless path which runs substantially parallel to said work support, said chain comprising a plurality of pairs of elements disposed normal to said work support, members connecting said pairs of elements of at least one of said element pairs for permitting the spacing of said two elements to be adjusted, whereby the length of said chain can be made substantially equal to the length of the path determined by the means which guides said chain, friction members carried by said chain at spaced locations along the length thereof, a flexible belt engaging a plurality of said friction members, and means for driving said belt to effect movement of said chain along its said path.

5. In a contouring machine, a work support, a plurality of pairs of elements disposed normal to said work support and each having a plurality of vertically spaced bearing sections thereon, members connecting the elements of each pair and pivotally connecting said pairs of elements to form therewith an endless chain, means to support and guide said pairs of elements through a predetermined endless path comprising guide members arranged to engage predetermined bearing sections of said elements from at least one side of said path, a plurality of friction members carried by selected pairs of said elements intermediate the bearing sections on said elements, an endless flexible belt arranged to engage said friction members, and means for driving said belt.

6. In a tool propelling assembly for a contouring machine, a plurality of pairs of elongated elements disposed parallel to one another, an adjustabe member connecting the two elements of at least one pair of said elements and permitting the spacing of said two elements to be adjusted, drive members connecting the elements of each of the other pairs of elements, other members pivotally connecting said pairs of elements to form therewith an endless chain, means to support and guide said pairs of elements for movement serially through a predetermined endless path, an endless flexible belt arranged to engage said drive members, and means for driving said belt.

7. The combination with a flexible chain for carrying a tool through an endless path having reverse curves therein of means for driving said chain comprising a plurality of driving lugs secured at spaced intervals to said chain, each of said lugs having portions thereof extending outwardly of the path of said chain and providing at least one groove therein for receiving a belt, the front and rear surfaces of said outwardly extending portions of said lugs converging outwardly of the path of the chain to facilitate navigation of concave curves by said chain.

8. A tool chain for a contouring machine comprising a plurality of pin members arranged parallel to each other in an endless path, a plurality of links pivotally connecting adjacent pin members, and a plurality of driving lugs, each of said driving lugs being connected to two adjacent pin members and having at least one groove therein facing outwardly of the path of the chain, the grooves of all of said lugs lying in a single plane substantially parallel to the plane of movement of the chain to receive an endless belt encompassing the chain, said groove in each of said lugs being formed with convex curvature to facilitate reception of said belt when traversing convex curves in the path of movement of the chain, each of said lugs having the front and rear surfaces thereof extending outwardly of the path of the chain arranged in converging relationship to enable the chain to execute reverse curves in its path of travel.

9. In a contouring machine, an endless tool carrying chain movable in a predetermined endless path, said chain comprising a plurality of pin members arranged parallel to each other and normal to the plane of movement of the chain, and a plurality of links pivotally connecting adjacent pin members, a plurality of driving lugs carried by said chain and having grooves therein opening outwardly of the path of movement of the chain, and a belt encompassing said chain and disposed within the groove in at least one of said lugs for driving said chain, at least two of said lugs being carried by succeeding pairs of said pin members and having outwardly converging front and rear surfaces to prevent interference between said two lugs when said chain navigates a concave curve in its path of movement.

10. In a contouring machine, an endless tool carrying chain movable in a predetermined endless path, said chain comprising a plurality of elements pivotally connected on axes disposed normal to the plane of movement of the chain, a plurality of driving lugs carried by said chain, each of said lugs having at least one V-shaped groove in the surface thereof facing outwardly of the path of travel of said chain, the grooves of all of said lugs extending parallel to said plane of movement, an endless belt encompassing said chain and positioned in registry with at least one of said driving lugs in at least one location along the path of movement of said chain, and means for driving said belt in an endless path to effect movement of said chain in its path.

References Cited in the file of this patent

UNITED STATES PATENTS

| | | |
|---|---|---|
| 2,517,901 | Luckenbach | Aug. 8, 1950 |
| 3,031,894 | Chavand | May 1, 1962 |